United States Patent
Koumbis et al.

[11] Patent Number: 5,950,971
[45] Date of Patent: Sep. 14, 1999

[54] ASSEMBLY FOR AND METHOD OF MOUNTING A SUSPENSION MEMBER TO AN AXLE HOUSING

[75] Inventors: Chris Koumbis, Burr Ridge; Tjong T. Lie, Naperville, both of Ill.

[73] Assignee: The Boler Company, Itasca, Ill.

[21] Appl. No.: 08/672,583

[22] Filed: Jun. 28, 1996

[51] Int. Cl.$^6$ ............................................... F16M 11/00
[52] U.S. Cl. ..................................... 248/200; 280/688
[58] Field of Search .......................... 248/201, 220.22, 248/200; 280/688, 711, 712

[56] References Cited

U.S. PATENT DOCUMENTS

| | | |
|---|---|---|
| 1,841,843 | 1/1932 | North . |
| 1,892,932 | 1/1933 | Cook . |
| 1,901,287 | 3/1933 | Corriveau . |
| 3,378,250 | 4/1968 | Marti . |
| 3,398,946 | 8/1968 | Mathers . |
| 3,547,215 | 12/1970 | Bird ......................................... 180/71 |
| 3,602,523 | 8/1971 | Poulos ................................. 280/104.5 |
| 3,679,188 | 7/1972 | Trindle ..................................... 267/52 |
| 3,751,021 | 8/1973 | Foster ....................................... 267/52 |
| 3,785,673 | 1/1974 | Harbers, Jr. et al. ................... 280/124 |
| 3,801,086 | 4/1974 | Raidel ....................................... 267/67 |
| 4,114,923 | 9/1978 | Raidel ..................................... 280/711 |
| 4,141,428 | 2/1979 | Loeb ......................................... 267/52 |
| 4,162,090 | 7/1979 | Schwartz ................................. 280/688 |
| 4,166,640 | 9/1979 | Van Denberg .......................... 280/711 |
| 4,519,590 | 5/1985 | Nells ......................................... 267/52 |
| 4,541,653 | 9/1985 | Raidel ..................................... 280/711 |
| 4,643,406 | 2/1987 | Mounier-Poulat et al. ............... 267/52 |
| 4,693,486 | 9/1987 | Pierce et al. .............................. 280/80 |
| 4,705,294 | 11/1987 | Raidel ..................................... 280/711 |
| 4,718,692 | 1/1988 | Raidel ..................................... 280/713 |
| 4,722,549 | 2/1988 | Raidel ..................................... 280/711 |
| 4,801,129 | 1/1989 | Wells ......................................... 267/52 |
| 4,858,949 | 8/1989 | Wallace et al. ......................... 280/713 |
| 4,895,350 | 1/1990 | Schoof et al. ............................. 267/52 |
| 4,946,190 | 8/1990 | Büttnur ................................... 280/712 |
| 5,013,063 | 5/1991 | Mitchell .................................. 280/711 |
| 5,288,100 | 2/1994 | Cherry et al. ........................... 280/688 |
| 5,346,247 | 9/1994 | Snyder .................................... 280/712 |
| 5,366,237 | 11/1994 | Dilling et al. .......................... 280/711 |
| 5,464,245 | 11/1995 | Vegler .................................... 280/720 |

*Primary Examiner*—Leslie A. Braun
*Assistant Examiner*—Kimberly Wood
*Attorney, Agent, or Firm*—Lockwood, Alex, FitzGibbon & Cummings

[57] ABSTRACT

A composite structure for method of mounting a vehicle suspension member, such as a leaf spring or a main support member, to an axle housing is disclosed. The invention is particularly useful in the truck and trailer industry. An axle bracket is welded to the axle housing. A cover and an axle seat are clamped so as to compress the suspension member and a top pad between them The cover and axle seat are then welded together. The axle seat and axle bracket may then be bolted together. A spacer plate may be inserted between the rear portions of the axle seat and axle bracket so as to increase the pinion angle of the vehicle axle. This allows the invention to be utilized in a variety of installations

3 Claims, 2 Drawing Sheets

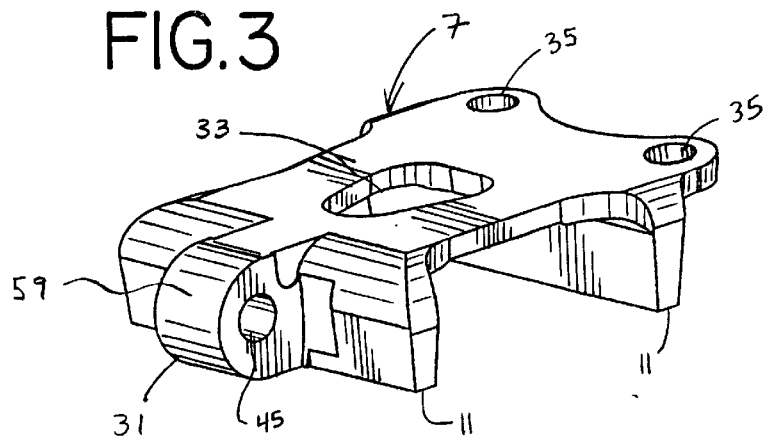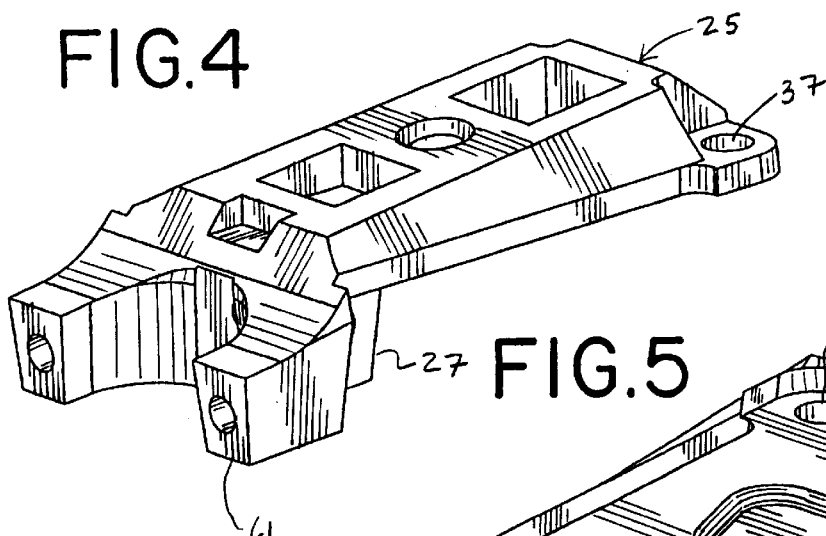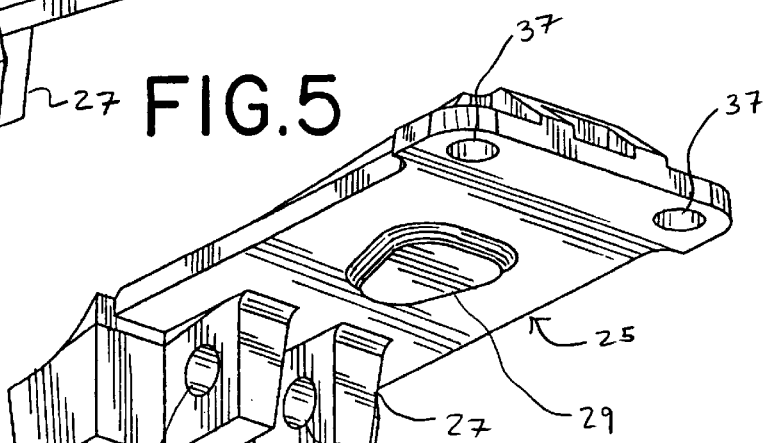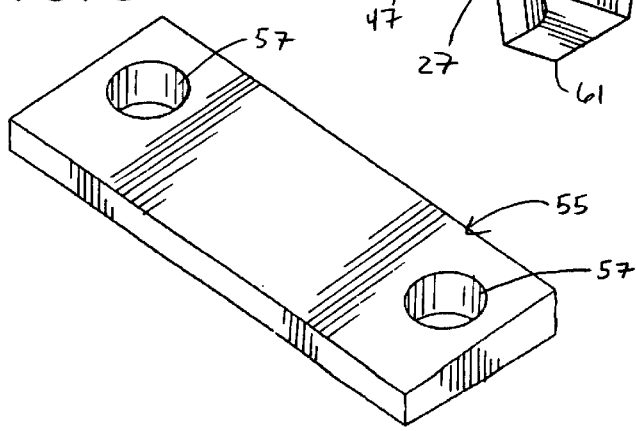

000# ASSEMBLY FOR AND METHOD OF MOUNTING A SUSPENSION MEMBER TO AN AXLE HOUSING

BACKGROUND AND DESCRIPTION OF THE INVENTION

1. Field of the Invention

The present invention relates generally to vehicle suspension systems and, more particularly, to a means for, and method of, mounting a truck suspension member to a truck axle housing.

2. Discussion

The subject invention finds particular utility in the heavy, medium and light duty truck and trailer industry. In this industry, common suspension installations have for a long time featured axles attached to single leaf spring assemblies.

Recently, the use of air-ride beam-type suspensions in the truck and trailer industry has become quite popular. Such suspensions come in various forms. Generally speaking, however, they include a pair of longitudinally extending flexible beams, one each of which is located adjacent to one of the two longitudinal side frame rails located underneath the body of the truck or trailer chassis. These beams, sometimes called main support members, Z-beams or gooseneck springs, are each pivotally connected at one end to a frame hanger that is attached to the adjacent frame rail of the vehicle. Spaced along the beam at a distance from the frame hanger is an air bag (bellows) and an axle. Examples of this type of suspension are the Hendrickson HA series suspension and the suspension disclosed in Snyder U.S. Pat. No. 5,346,247 issued Sep. 13, 1994. In such suspensions, a square axle housing is typically secured to each main support member by clamping the axle housing using a bracket assembly comprised of a pair of U-bolts, a top seat, a bottom cap and attaching nuts.

While the use of such bracket assemblies to attach truck axles to suspension members has proven for a long time to be effective, it would be advantageous to eliminate the need for the numerous parts involved. Cost and weight would both be reduced as would assembly time if a simpler axle attachment means were utilized.

It would be even more advantageous if this simpler axle attachment means were easily adjustable to various suspension member sizes and pinion angles so the same components could be used with a variety of different suspension installations.

In terms of maintenance, the U-bolts of existing bracket assemblies require retorqueing after a certain amount of truck usage. Additionally, if the compressing clamp load of the U-bolts is not properly adjusted when the suspension is installed, the axle housing could become overstressed due to the dynamic loads introduced during operation, and plastically (and thus permanently) deform. As a result, the axle assembly would loosen and eventually come apart.

Accordingly, an object of the invention is to provide a means of mounting suspension members on vehicle axles which utilizes a minimal number of parts.

Another object of the invention is to provide a means of mounting suspension members on vehicle axles which offers ease of assembly.

Another object of the invention is to provide a means of mounting suspension members on vehicle axles which is easily adjustable to fit suspension members of various sizes.

Another object of the invention is to provide a means of mounting suspension members on vehicle axles which allows for the easy adjustment of the pinion angle.

Another object of the invention is to provide a means of mounting suspension members on vehicle axles that does not require the use of U-bolts.

Another object of the invention is to provide a means of mounting suspension members on vehicle axles so that minimal or no compressive forces are exerted upon the axle housings.

Another object of the invention is to provide a simple and reliable method of mounting suspension members on vehicle axles.

SUMMARY OF THE INVENTION

The present invention is directed to a means for, and method of, mounting a vehicle suspension member, such as a leaf spring or a main support member, to a vehicle axle housing. An axle bracket is welded to the axle housing. The vehicle suspension member is clamped between a saddle-shaped cover and an axle seat. A top pad is sandwiched between the top of the suspension member and the bottom of the cover if necessary in order to align the bottom ends of the cover with the top of the axle seat and provide support for the top of the Z-spring. While clamped, the cover is then welded to the top of the axle seat so as to form a top assembly. This top assembly may then be bolted to the axle bracket so as to connect the axle housing and the suspension member. A spacer plate may be positioned between the rearward portions of the axle bracket and axle seat so as to effect an increase in the pitch of the axle housing if the installation so requires.

For a more complete understanding of the nature and scope of the invention, reference may now be had to the following detailed description of embodiments thereof taken in conjunction with the appended claims and accompanying drawings.

BRIEF DESCRIPTION OF THE DRAWINGS

FIG. 3 is an isometric view of the axle bracket forming one part of the embodiment of FIG. 1;

FIG. 4 is an isometric view of the axle seat forming another part of the embodiment of FIG. 1;

FIG. 5 is an isometric view of the bottom of the axle seat of FIG. 4; and

FIG. 6 is an isometric view of the spacer plate forming still another part of the embodiment of FIG. 1.

DESCRIPTION OF THE PREFERRED EMBODIMENT

Figure 1:
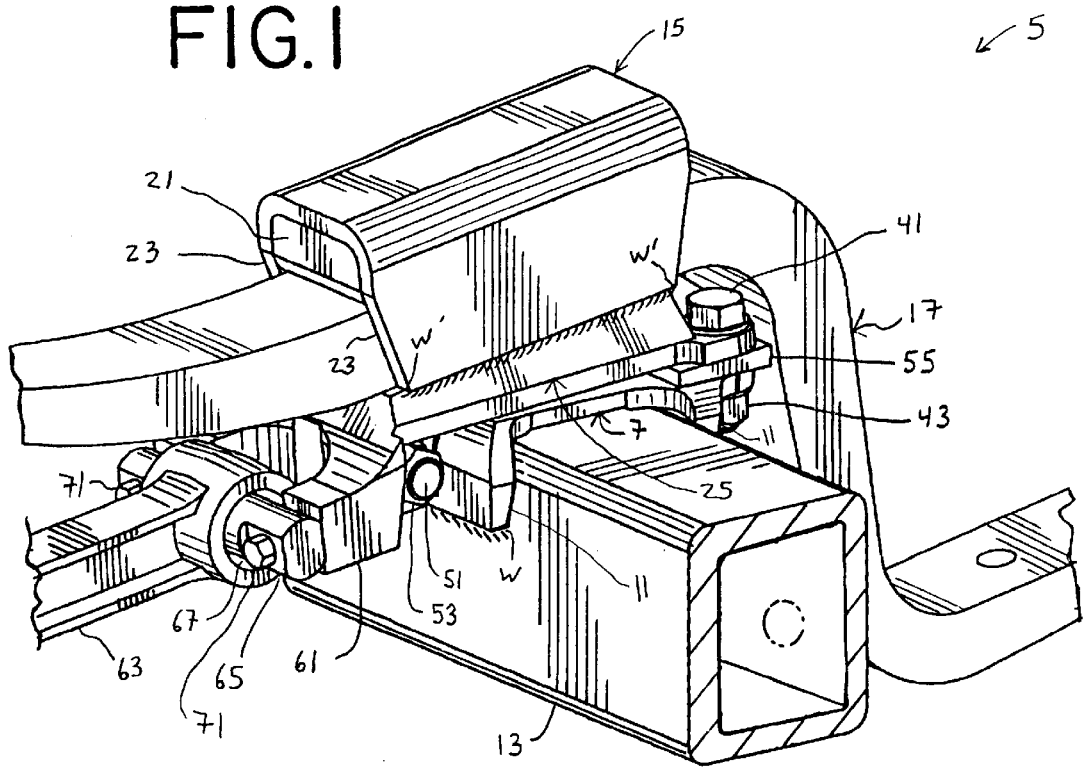
FIG. 1 is a fragmentary isometric view of an embodiment of the invention whereby an axle housing is attached to a gooseneck shaped suspension member.
Figure 2:
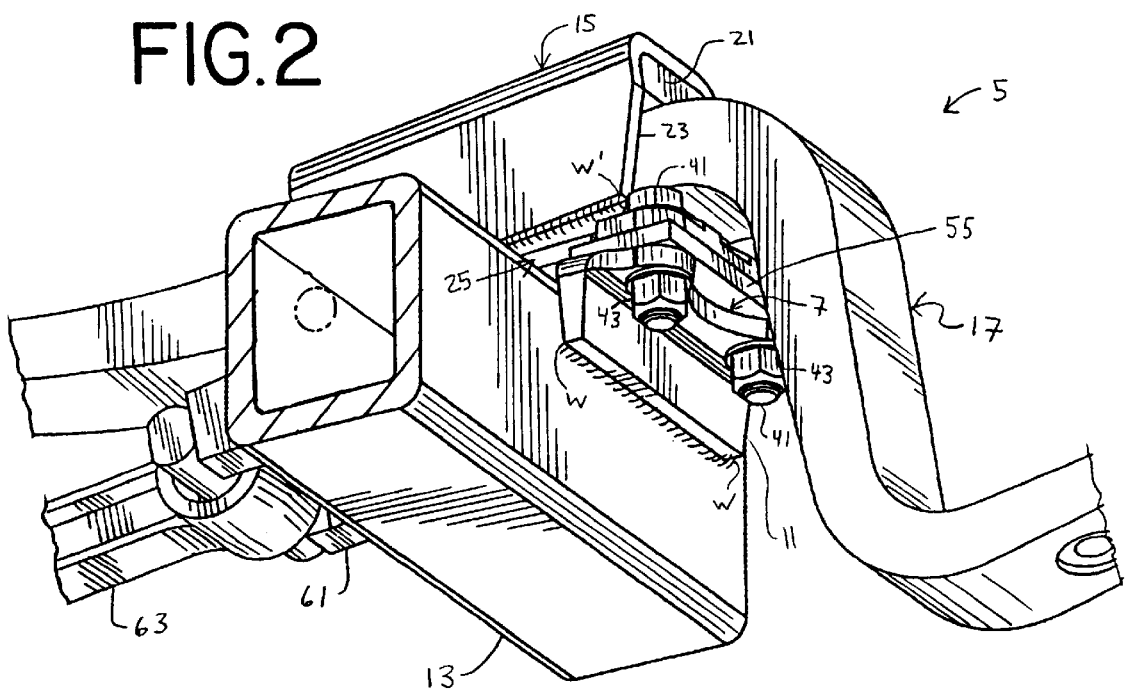
FIG. 2 is a fragmentary isometric view of the embodiment of FIG. 1 showing the detail of the bottom of the portion of the installation as viewed from behind the axle housing.

Referring to FIGS. 1 and 2, an embodiment of the means of attaching an axle housing to a suspension member in accordance with the present invention is indicated generally at 5. FIGS. 1–3 show an axle bracket indicated generally at 7. Axle bracket 7 features downwardly extending flanges 11—11. Flanges 11—11, as shown in FIGS. 1 and 2, are attached at their inner surfaces to the front and back surfaces of axle housing 13 by welding indicated at W—W.

As shown in FIGS. 1 and 2, a saddle shaped cover, indicated generally at 15, straddles a gooseneck shaped suspension member indicated generally at 17. Top pad 21 is disposed on the suspension member 17 and within the upper portion of the cover 15 and between its side walls 23—23. It will be understood that a top pad having a different thickness from pad 21 may be substituted for top pad 21 so as to accommodate a suspension member 17 of a different thickness. An axle seat, indicated generally at 25 in FIGS. 1, 2, 4 and 5, is disposed beneath suspension member 17 and side walls 23—23 of cover 15.

During assembly, clamps are used to exert force upon the top of cover 15 and the bottom of axle seat 25 so as to compress suspension member 17 and top pad 21 between them. While the clamping force is applied, welding W'—W', as shown in FIGS. 1 and 2, is performed so as to secure cover 15 to axle seat 25 with suspension member 17 and top pad 21 secured between them.

As shown in FIG. 5, axle seat 25 features a pair of spaced lugs 27—27 and a boss 29 on its bottom-side. FIG. 3 shows that axle bracket 7 features an apertured protrusion 31 and an opening 33. The spacing between lugs 27—27 and the size and shape of opening 33 of axle seat 25 are such as to receive protrusion 31 and boss 29 of axle bracket 7, respectively, so that the axle bracket 7 and axle seat 25 fit and mate together as shown in FIGS. 1 and 2. With axle bracket 7 and axle seat 25 so assembled, axle bracket vertical bolt holes, indicated at 35—35 (FIG. 3) in axle bracket 7, and axle seat vertical bolt holes, indicated at 37—37 (FIG. 4), are aligned so that bolts 41—41 and nuts 43—43, as shown in FIGS. 1 and 2, may be installed to secure axle bracket 7 and axle seat 25 together at the rear. Furthermore, axle bracket horizontal bolt hole 45 (FIG. 3) and axle seat horizontal bolt holes 47—47 (FIG. 5) are also aligned so that a bolt 51 and nut 53 (FIG. 1), may be installed to secure axle bracket 7 and axle seat 25 together at the front.

FIG. 6 shows a spacer plate indicated generally at 55. Spacer plate 55 features vertical bolt holes 57—57 that may be aligned with axle bracket vertical bolt holes 35—35 and axle seat vertical bolt holes 37—37 so that spacer plate 55 may be inserted and secured between the rearward portions of axle bracket 7 and axle seat 25, as shown in FIGS. 1 and 2.

As shown in FIG. 3, rounded surface 59 of protrusion 31 of axle bracket 7 allows the rearward portion of axle seat 25 to be raised and the axle seat pivoted on the bolt 51. Insertion of the spacer plate as shown in FIGS. 1 and 2 results in a change in the axle pinion angle. By inserting spacer plates of various thicknesses, various pinion angles maybe effected. This capability allows the invention to be adaptable to a multitude of installations. Different vehicles have different engine locations with respect to their drive axles which in turn varies the pinion angle requirements of the vehicles.

As shown in FIGS. 4 and 5, axle seat 25 features an integrally formed bifurcated bracket 61. Bracket 61 is sized so that an end of a torque rod 63 may be connected thereto, as shown in FIGS. 1 and 2, by a pin 65 extending from opposite sides of eye 67 on the end of rod 63. Pin 65 is attached to bifurcated bracket 61 by bolts 71, as shown in FIG. 1.

Having described the invention generally in detail in connection with the drawings, including presently preferred embodiments thereof, those skilled in the art will be able to practice the invention either according to the embodiments disclosed or according to other embodiments with out departing from the spirit and scope of the appended claims.

What is claimed is:

1. In combination with each end of a vehicle axis housing and a vehicle suspension member mounted thereon:

a) an axle bracket welded to the axle housing;

b) a saddle-shaped cover mounted on said vehicle suspension member; and c) an axle seat disposed between the underside of said suspension member and the upper side of said axle bracket, said axle seat being fastened to said axle bracket, and axle seat being welded to said cover; and wherein a spacer plate is sandwiched between a generally horizontal rearward portion of said axle bracket and a generally horizontal rearward portion of said axle seat so as to angularly adjust the vertical spacing between said rearward portions and thereby effect an increase or decrease in the pitch of the axle housing.

2. In combination with each end of a vehicle axle housing and a vehicle suspension member mounted thereon:

a) an axle bracket welded to the axle housing;

b) a saddle-shaped cover mounted on said vehicle suspension member; and c) an axle seat disposed between the underside of said suspension member and the upper side of said axle bracket, said axle seat being fastened to said axle bracket, and said axle seat being fastened to said cover; wherein a spacer plate is sandwiched between a rearward portion of said axle bracket and a rearward portion of said axle seat so as to effect an increase in the pitch of the axle housing; and, wherein forward portions of said axle bracket and said axle seat are pivotally connected on a transverse horizontal axis whereby spacer plates of different thicknesses may be sandwiched between said rearward portions, and fastener means securing said rearward portions together with a said spacer plate sandwiched therebetween.

3. The combination called for in claim 2, wherein said foreward portions of said axle bracket and said axle seat have apertured interfitting formations with a bolt extending through the apertures.

* * * * *